UNITED STATES PATENT OFFICE.

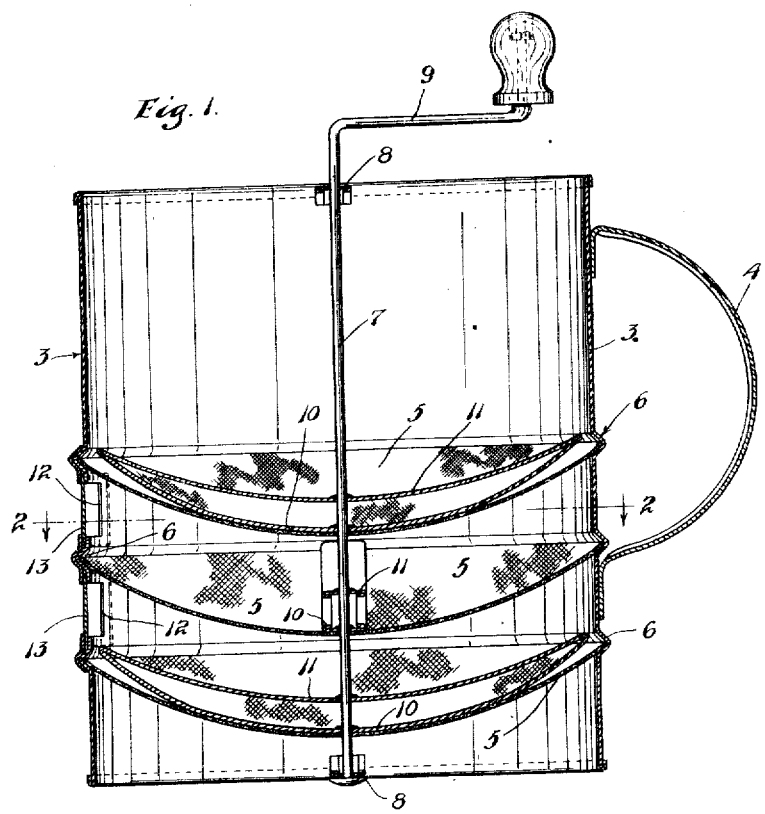
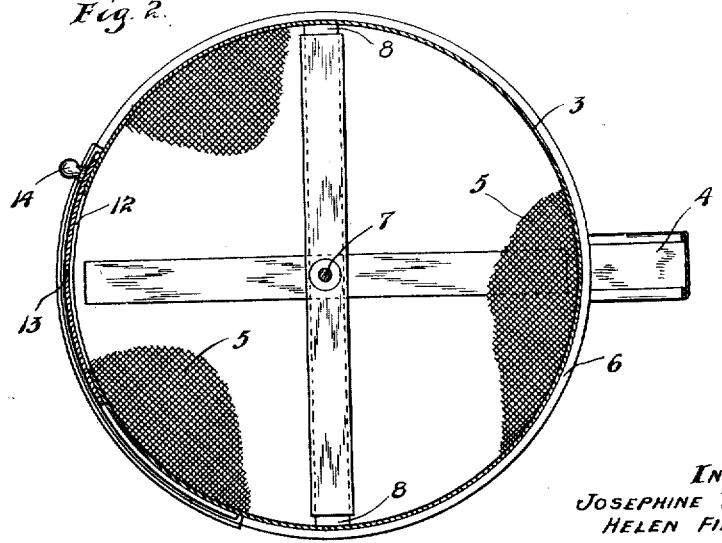

JOSEPHINE TONSTAD AND HELEN FINSNESS, OF ST. PAUL, MINNESOTA.

FLOUR-SIFTER.

1,347,064. Specification of Letters Patent. Patented July 20, 1920.

Application filed October 31, 1919. Serial No. 334,673.

*To all whom it may concern:*

Be it known that we, JOSEPHINE TONSTAD and HELEN FINSNESS, citizens of the United States, residing at St. Paul, in the county of Ramsey and State of Minnesota, have invented certain new and useful Improvements in Flour-Sifters; and we do hereby declare the following to be a full, clear, and exact description of the invention, such as will enable others skilled in the art to which it appertains to make and use the same.

Our invention relates to improvements in flour sifters, and, to this end, it consists of the novel devices and combinations of devices hereinafter described and defined in the claim.

As is well known, in making certain kinds of cakes and pastry, it is necessary to sift the flour, to be used therein, a plurality of times to remove therefrom all foreign matter and leave the flour in a loose and finely separated condition. It is now the custom to sift the flour several times into a dish and each time it is sifted it is necessary to empty the same from the dish into the sifter. This process is not only very slow in its action, but necessitates the use of an extra dish and causes more or less waste of flour and disorder on the work table. To overcome this objection to flour sifters having only a single sieve bottom, we provide a flour sifter having a plurality of vertically spaced sieve bottoms, over the tops of which are located coöperating and simultaneously operated scrapers.

In the accompanying drawings, which illustrate the invention, like characters indicate like parts throughout the several views.

Referring to the drawings:—

Figure 1 is a view of the improved flour sifter principally in central vertical section; and Fig. 2 is a transverse section taken substantially on the line 2—2 of Fig. 1.

The numeral 3 indicates a cylindrical shell having beaded upper and lower edges and a handle 4. Mounted within the shell 3 are a plurality of concave sieve bottoms 5 that are secured in position and held vertically spaced by forming in the wall of the shell 3 annular internal grooves 6 to receive and hold the annular edge portions of said sieve bottoms.

Extending axially through the shell 3 and sieve bottoms 5, is an operating stem 7 journaled at its ends in upper and lower transverse bars 8, the ends of which are permanently secured to the inner wall of said shell. The upper end of the stem 7 is bent to afford a finger-piece-equipped crank 9, by which said stem may be rotated.

Overlying each sieve bottom 5 is a scraper 10 and an agitator 11. These two members are in the form of segmental bars connected at their ends and vertically spaced at their intermediate portions and rigidly secured to the stem 7 which projects therethrough. The combined scrapers 10 and agitators 11 extend substantially the full width of the shell 3 and the ends of said scrapers are curved to extend above the sieve bottoms 5 so that only their intermediate portions come in direct contact with the upper faces of the sieve bottoms 10. The upturned end portions of the scrapers 10 coöperate with the agitators 11 to assist the same in their work. It will be noted that the upper and lower scrapers 10 and agitators 11 are located in the same vertical plane, while the intermediate scraper and agitator extend at right angles thereto.

Formed in the shell 3, between adjacent sieve bottoms 5, are discharge openings 12, each of which is normally closed by a sliding gate 13 slidably mounted in guides on the shell 3 and having a finger piece 14 by which it may be operated. The purpose of the openings 12 is, of course, to permit the discharge of waste material caught between the sieve bottoms.

What we claim is:—

A flour sifter comprising a shell, a plurality of vertically spaced sieve bottoms in the shell, an upright stem journaled in the shell and having on its upper end an operating crank, scrapers secured to the stem and working over the upper faces of the sieve bottoms, a discharge opening in the shell between each pair of sieve bottoms, and individually operated gates for the discharge openings.

In testimony whereof we affix our signatures in presence of two witnesses.

JOSEPHINE TONSTAD.
HELEN FINSNESS.

Witnesses:
WINIFRED I. WARD,
HARRY D. KILGORE.